US006271270B1

(12) United States Patent
Muzzy et al.

(10) Patent No.: US 6,271,270 B1
(45) Date of Patent: Aug. 7, 2001

(54) FIBER-REINFORCED RECYCLED THERMOPLASTIC COMPOSITE

(75) Inventors: John D. Muzzy, Atlanta; David W. Holty, Big Canoe; Douglas C. Eckman, Woodstock; John R. Stoll, Suwanee, all of GA (US)

(73) Assignee: Georgia Composites, Atlanta, GA (US)

( * ) Notice: Subject to any disclaimer, the term of this patent is extended or adjusted under 35 U.S.C. 154(b) by 0 days.

(21) Appl. No.: 09/272,801

(22) Filed: Mar. 19, 1999

Related U.S. Application Data (63) Continuation-in-part of application No. 08/853,037, filed on Apr. 25, 1997, now abandoned.
(60) Provisional application No. 60/016,188, filed on Apr. 25, 1996.

(51) Int. Cl.$^7$ .............................. C08J 11/06; B32B 3/28; B29C 47/00
(52) U.S. Cl. ..................... 521/48; 521/40.5; 521/45.5; 521/47; 521/49.8; 523/222; 428/34.7; 428/74; 428/95; 428/97; 428/287; 428/903.3; 264/37.1
(58) Field of Search ............... 521/48, 40.5, 45.5, 521/47, 49.8; 523/222; 428/34.7, 74, 95, 97, 287, 903.3; 264/37.1

(56) References Cited

U.S. PATENT DOCUMENTS

| | | | |
|---|---|---|---|
| 2,577,205 | 12/1951 | Meyer et al. | 154/101 |
| 4,029,839 | 6/1977 | Lesti | 428/306 |
| 4,310,585 | 1/1982 | Shannon | 428/218 |
| 5,134,016 | 7/1992 | Geary, Jr. et al. | 429/198 |
| 5,258,445 * | 11/1993 | Sperk, Jr. et al. | 524/597 |
| 5,470,648 | 11/1995 | Pearlman et al. | 428/247 |
| 5,494,628 | 2/1996 | Beyer et al. | 264/125 |
| 5,554,831 | 9/1996 | Matsukawa et al. | 181/294 |
| 5,578,357 * | 11/1996 | Fink | 428/95 |
| 5,591,802 | 1/1997 | David et al. | 525/66 |
| 5,830,548 * | 11/1998 | Andersen et al. | 428/36.4 |

OTHER PUBLICATIONS

Polymeric Materials Encyclopedia, Jozsef Karger–Kocsis, Glass Mat Reinforced Thermoplastics, p. 2761, 1996, vol. 4.
Polypropylene Structure, Blends and Composites, vol. 3 Composites, Glass Mat Reinforced Polypropylene, L. A. Berglunnd and M. L. Ericson, p. 203, 1995.
Carpet Recycling Technology, by Hugh C. Gardner, Amoco Fabrics and Fibers Company, Aug. 1995.

\* cited by examiner

*Primary Examiner*—James J. Seidleck
*Assistant Examiner*—Olga Asinovsky
(74) *Attorney, Agent, or Firm*—Thomas, Kayden Horstemeyer & Risley, LP

(57) ABSTRACT

Fiber-reinforced recycled thermoplastic composites and methods for their manufacture are presented. In a preferred embodiment, the thermoplastic composite incorporates a matrix of recycled thermoplastic and a plurality of high modulus fibers, with the recycled thermoplastic including polyethylene, polypropylene, nylon, PET and styrene-butadiene rubber, and the high modulus fibers including glass fibers, natural fibers, carbon fibers, and aramid fibers. Preferably, each of the high modulus fibers have a minimum length of approximately ½ of an inch and a modulus of approximately one million psi.

11 Claims, 4 Drawing Sheets

FIBER-REINFORCED RECYCLED THERMOPLASTIC COMPOSITE

CROSS-REFERENCE TO RELATED APPLICATIONS

This application is a Continuation-In-Part application which is based on and claims priority to U.S. patent application Ser. No. 08/853,037, filed Apr. 25, 1997, now abandoned, which is based on and claims priority to U.S. Provisional Patent Application Ser. No. 60/016,188, filed Apr. 25, 1996.

BACKGROUND OF THE INVENTION

1. Field of the Invention

The present invention generally relates to fiber reinforced composites and methods for their manufacture and, in particular, to fiber reinforced composites which incorporate recycled thermoplastic.

2. Description of the Related Art

Thermoplastic reinforced with random glass mat (also referred to as glass mat thermoplastic or G MT is sold commercially in significant quantities (more than 200 million pounds per year). GMT is usually supplied as semi-finished sheets which are heated and compression molded to desired conformations. GMT is a very tough product with moderate stiffness that is used extensively by the automotive and construction industries. Typical automotive applications include battery trays, seats, station wagon loading doors, bumper beams, and sound shields.

GMT sheets are often commercially manufactured by a melt impregnation process. The glass fiber is typically either a swirled mat of continuous fiber or chopped fibers held together in a mat by a binder. GMT typically contains 20–50% by weight glass, more commonly about 30–40%. The matrix thermoplastic is commonly polypropylene (PP) although other thermoplastics are also used, such as polyamide-6,6 (nylon 66) and polyamide-6 (nylon 6) and polyethylene terephthalate (PET). Products are formed from GMT sheets by compression molding a process wherein sheets of GMT are layered to a desired thickness, heated and placed in or on a mold, and pressure is applied to shape the sheets into the shape of the mold.

Recycled thermoplastic can be derived from many sources. One of the more plentiful and less expensive sources is carpet, such as from manufacturing waste or pre or post consumer waste. Whole carpet waste is produced during manufacture from unsold merchandise, and from post consumer disposal. Typically, whole carpet comprises nylon, polypropylene or PET pile or tufts, at least one backing formed from one or more polyolefins, such as polypropylene, and an adhesive material of styrene-butadiene rubber (SBR) applied as a latex and filled with an inorganic filler such as calcium carbonate. If the carpet is obtained post use, it may also contain some amount of dirt. A typical carpet sample has a pile weight of about 40 oz. per square yard, a backing weight of about 8 oz. per square yard and an adhesive weight (SBR latex and filler) of 24 oz. per square yard. In other words, a nylon (or PET) carpet sample may comprise about 56% nylon (or PET), about 11% polypropylene, and about 33% SBR plus filler.

Single component carpet waste results during manufacture when the upper section of the carpet tufts are trimmed off, producing a waste material referred to as carpet lint or shear lint. Nearly pure single component waste can also be produced from separation processes, such as a separation process employed to recapture nylon. In such a process large amounts of polypropylene or other backing material may be recovered and there exists a need to find a suitable use for this material. Also, fiber waste is generated from the residual material left on tufting machines, from fiber spinning and from yarn preparation. It has become apparent in recent years that there is a need for finding uses for this, otherwise, discarded material.

Carpet recycling to form a thermoplastic composition is taught by David et al. in U.S. Pat. Nos. 5,294,384 and 5,591,802. The composition taught by David et al. is prepared by melt blending the carpet sample in an extruder which intensively mixes the components through high shearing stresses. The melt blend can then be cut into pellets, for example, or another useful and commercially acceptable form. It is taught that the melt blend can be used in applications requiring virgin thermoplastic material.

An article by Hugh C. Gardner of Amoco Fabrics & Fibers Company published in IFJ (August 1995), page 36, entitled "Carpet Recycling Technology," discusses compression molding two pieces of carpet with a glass mat to obtain a laminate structure. Gardner teaches the use of whole pieces of carpet which is impracticable because it requires discrete placement of the carpet and glass mat. Furthermore, Gardner's laminated structure would not lend itself to the normal mode of processing GMT, which is flow molding under compression, because the resin in the core would squirt out to fill the mold and uniform spreading of the glass fibers would not be achieved.

GE Plastics in Pittsfield, Mass. sells a continuous strand glass fiber reinforced polypropylene sheet under the trademarks AZDEL® SM10400 and AZDEL® PM10400. The sheet has a glass fiber content of about 40% by weight with the remainder being polypropylene resin. Other grades of AZDEL® are sold with different glass contents. However, product literature on AZDEL® does not teach or suggest the use of recycled thermoplastic or the use of nylon as the thermoplastic.

Therefore, there is a need to address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention is generally directed to fiber reinforced thermoplastic composites which incorporate recycled thermoplastic, and methods for their manufacture. Without resorting to expensive separation and cleaning operations, recycled thermoplastics exhibit inferior properties compared to virgin thermoplastics. This degradation is more pronounced when the recycled thermoplastic contains incompatible polymers, which is usual the case. Specialty polymers, which can "compatibilize" incompatible polymers, are sold to address this problem. In accordance with an aspect of this invention, however, reinforcing fibers are added to recycled thermoplastic to enhance certain properties (usually strength, stiffness and impact resistance) without the necessity of utilizing expensive separation and cleaning operations. Enhancement of the recycled thermoplastic composite is realized because the reinforcing fibers dominate the performance of the composite.

In a preferred embodiment, the thermoplastic composite incorporates a matrix of recycled thermoplastic and a plurality of high modulus fibers, with the recycled thermoplastics including polypropylene, nylon, PET and styrene-butadiene rubber, and the high modulus fibers including glass fibers, carbon fibers, natural fibers and raid fibers. Such high modulus fibers have a modulus greater than one million psi, substantially greater than the unreinforced matrix. The recycled thermoplastic material and high modulus fibers are combined under low stress conditions. By avoiding typical high stress combination processes, such as encountered in exon compounding, substantial attrition of the length of the high modulus fibers is avoided, thereby by preserving a long fiber length which imparts comparably high impact strengths to the composites. Preferably, each of the high modulus fibers have a minimum length of approximately ½ of an inch.

In accordance with another aspect of the present invention, thermoplastic composite is initially produced with at least a first layer and a second layer, with the first layer incorporating recycled thermoplastic and the second layer incorporating high modulus fibers. Preferably these layers are immediately combined into a thin composite web wherein the thermoplastic layer has merged with the reinforcing layer. In a preferred embodiment, the recycled thermoplastic is derived from carpet, with the high modulus fibers being present in the form of glass mat. It is also preferred that the initial web formed is thin so it can be collected as a continuous roll of web material.

A method aspect of the present invention includes the steps of: (1) providing recycled thermoplastic; (2) providing high modulus fibers, with each of said high modulus fibers has a minimum length of approximately ½ of an inch; (3) combining the recycled thermoplastic with the high modulus fibers; and (4) forming the recycled thermoplastic and the high modulus fibers into a partially consolidated web. In a preferred embodiment, the step of providing recycled thermoplastic comprises converting the recycled thermoplastic into particles, whereby the particles are applied as a coating to the high modulus fibers. In another preferred embodiment, the step of providing recycled thermoplastic comprises forming the recycled thermoplastic into film which is applied as a coating to the high modulus fibers.

In accordance with another aspect of the present invention, an alternative method incorporates the steps of: (1) forming a carpet into particles or film of recycled thermoplastic material; (2) providing a matrix of high modulus fibers; (3) applying the particles or film to the matrix of high modulus fibers; and (4) forming the particles or film and the matrix of high modulus into a consolidated sheet. Preferably, the consolidated sheet is then compression molded to form shaped objects for use in various applications.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
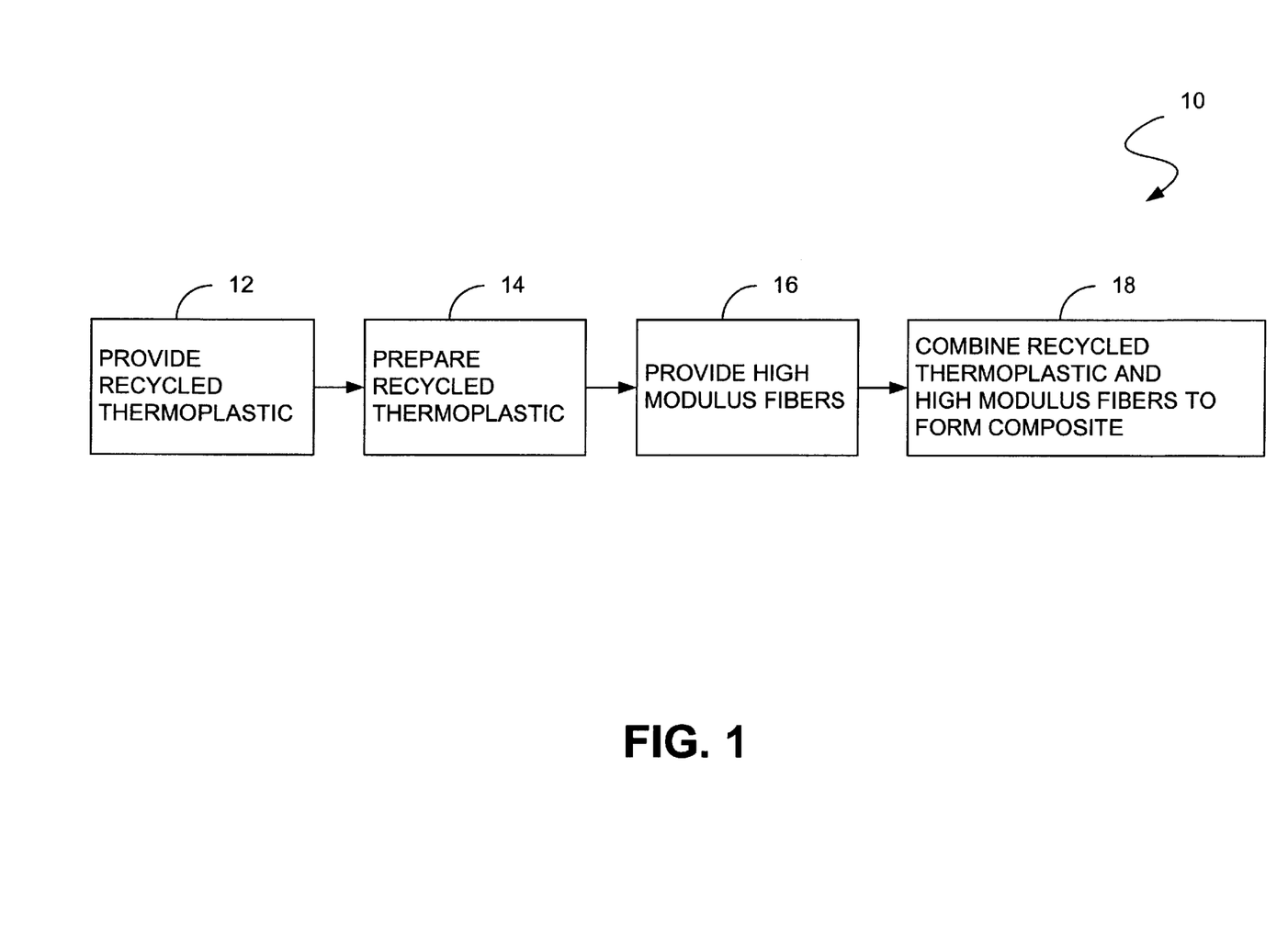
FIG. 1 is a high level block diagram illustrating a preferred method of manufacturing a thermoplastic composite in accordance with one aspect of the present invention.

Reference will now be made in detail to the description of the invention as illustrated in the drawings, wherein like reference numbers indicate like parts throughout the several views. As shown in FIG. 1, a preferred method 10 of manufacturing thermoplastic composites 100 FIGS. 2–5) in accordance with one aspect of the present invention includes the steps of providing recycled thermoplastic (step 12); preparing the recycled thermoplastic (step 14); providing high modulus fibers (step 16); and, then combining the prepared recycled thermoplastic and the high modulus fibers to form a thermoplastic composite (step 18).

Recycled thermoplastic used in the present invention can be obtained from many sources. A preferred source is carpet waste, due to its abundance. There are several waste streams from carpet production that result in the following forms of carpet waste: shear lint, which is typically near pure polypropylene, nylon, or PET; edge trim, which is typically whole carpet scrap; separated polypropylene, which is a byproduct of a separation process developed to obtain recycled nylon; waste fiber, which is left after fiber spinning, yarn formation and tufting; and, used or unsold whole carpet. The terms carpet scrap, carpet waste, or recycled carpet as used herein refer to all types of pre and post use carpet, waste from carpet production, post consumer use carpet, and unused, unsold carpet, as well as material from separation processes.

Whole carpet from edge trimming, unsold carpet and used carpet comprises nylon, polypropylene, or PET pile or tufts, at least one backing formed from one or more polyolefins, such as polypropylene, and an adhesive material of styrene-butadiene rubber (SBR) applied as a latex and filled with an inorganic filler, such as calcium carbonate. If the carpet is obtained post use, it may also contain some amount of dirt. A typical carpet sample has a pile weight of about 40 oz. per square yard, a backing weight of about 8 oz. per square yard and an adhesive weight (SBR latex and filler) of about 24 oz. per square yard. In other words, a nylon (or PEI) carpet sample comprises about 56% nylon (or PET), about 11% polypropylene, and about 33% SBR plus filler. A polypropylene carpet sample comprises about 67% polypropylene and about 33% SBR plus filler. The percentages put forth herein refer to weight percentages unless otherwise noted.

While the above are generally the more prevalent forms of carpet waste and compositions of carpet, the present invention is not limited to these sources or compositions. In fact, the mechanical properties of composites formed according to the present invention are generally independent of the source or type of recycled thermoplastic used because the mechanical properties of the composites are primarily determined by high modulus fibers, such as glass fibers. For instance, the properties of glass mat reinforced recycled thermoplastic (GMRT), described in greater detail hereinafter, made with nearly pure polypropylene waste are closer to the properties of GMT made with virgin polypropylene. However, because the properties of GMT are dominated by the glass component, a GMRT made with multicomponent recycled thermoplastic has comparable properties at an even lower cost. In other words, whole carpet waste does not need to be separated into its component parts in order to be used effectively in the present invention.

Figure 2:
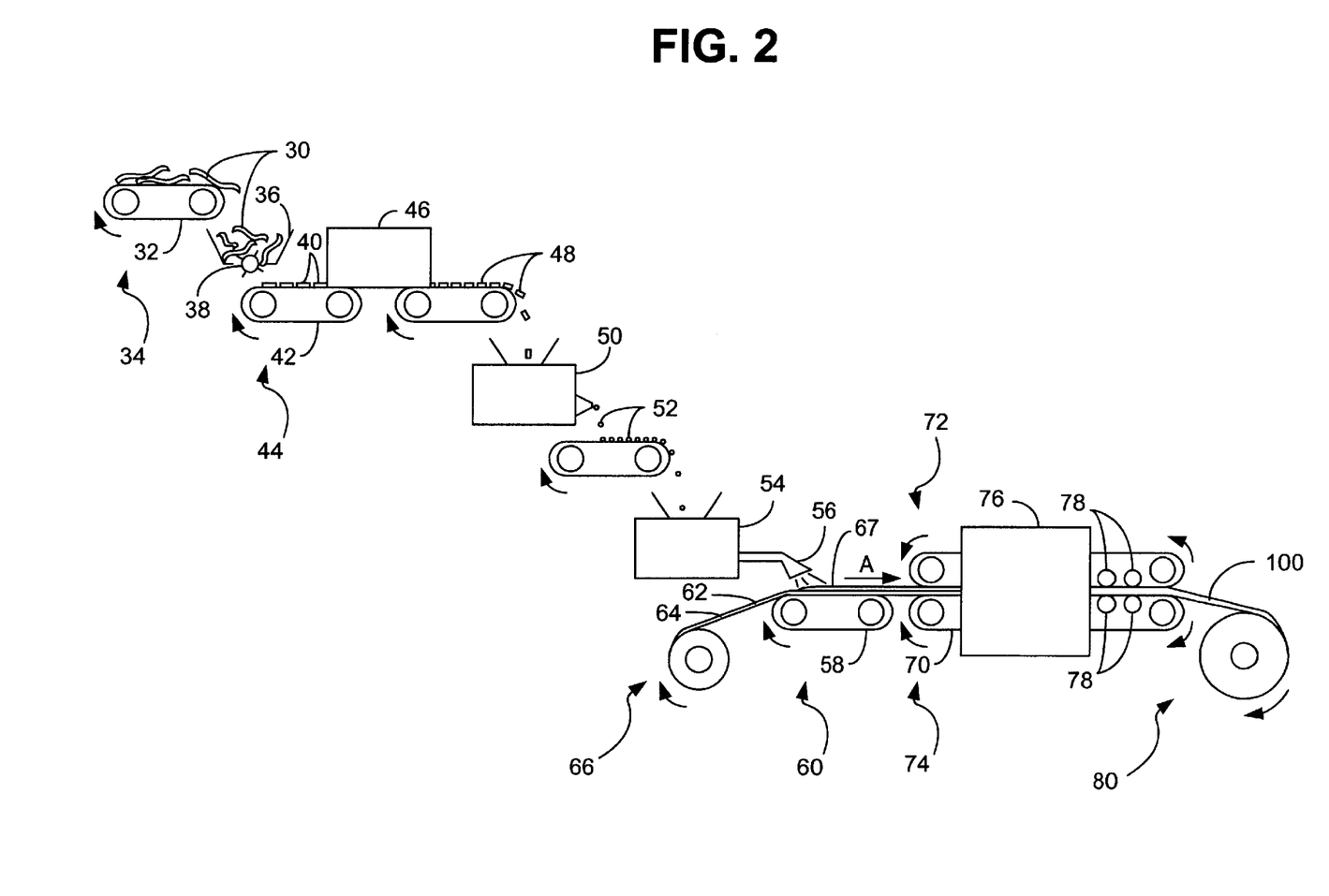
FIG. 2 is a schematic diagram illustrating a preferred method of manufacturing a thermoplastic composite of the present invention.

A preferred method for manufacturing thermoplastic composites in accordance with an aspect of the present invention is shown in FIG. 2. As shown in FIG. 2, whole carpet 30 is placed on the moving belt 32 of a conveyor section 34, which delivers the carpet to a guillotine, 36. The sliced carpet is conveyed to a shredder 38, which chops the carpet into short lengths 40 of the carpet. Typically, these carpet lengths 40 are less than one inch long, although various other lengths can be utilized. Preferably, carpet sections 40 are placed on the moving belt 42 of a conveyor section 44 and delivered to a separator 46. The separator is configured to separate the various components of a whole carpet, with undesirable components of the carpet, i.e. dirt, being discarded as desired. To achieve a high degree of separation among the constituents the cut lengths must be well below one inch, which is more expensive. In some embodiments, however, a separator is not included, thereby allowing the entirety of the carpet to be formed into thermoplastic composite 100. An alternative means of separation is to wash the carpet sections 40 to remove dirt and sizing.

After departing separator 46, selected carpet portions 48 are delivered, such as by the belt of a conveyor section, to an extruder 50 which melts the carpet portions and forms the melted material of the carpet into an extruded product, such as pellets 52. Pellets 52 are then delivered to a grinder 54 which reduces the pellets to a size appropriate for being applied with a particle dispenser 56. It should be noted that other embodiments of the present invention receive recycled thermoplastic in the form of pre-formed pellets, thereby alleviating the necessity of the aforementioned processing prior to the grinder 54. Coater 56 is oriented above a belt 58 of a conveyor section 60, which is also provided on an upper surface thereof with a continuous feed of high modulus reinforcing fibers 62, such as glass fibers, carbon fibers, natural fibers and aramid fibers. Care must be taken to ensure that the reinforcing fibers each have an approximate length of at least ½ of an inch in order that proper reinforcement of the thermoplastic composite 100 is achieved; therefore, delivery of the reinforcing fibers through a device, such as a screw-extruder, or mixing of the fibers in an aggressive mixer, is inappropriate, and will result in a degradation of physical properties of the thermoplastic composite 100. Because of the small clearances between the screw and the inside of the barrel of a screw extruder and the high shear forces generated by the screw, the maximum fiber length at the output of a screw extruder is typically 0.75–1.25 mm. See, A Brent Strong, *High Performance and Engineering Thermoplastic Composites,* Technomic Pub, Lancaster, Pa., 1993, p.97. In the embodiment depicted in FIG. 2, reinforcing fibers 62 are provided in the form of a glass mat 64, typically with a basis weight between approximately 100 g/m$^2$ and approximately 750 g/m$^2$, which is supplied from a supply roll 66. Alternatively, glass rovings are chopped in-line and deposited on the belt as a random mat.

As glass mat 64 is advanced along conveyor section 60 in direction A, coater 56 applies a coating 67 of thermoplastic particles, typically with a basis weight between approximately 100 g/m$^2$ and approximately 1,000 g/m$^2$, upon the upper surface of the glass mat or both above and below the glass mat. Alternatively, the thermoplastic can be applied as a hot coating directly from a film die on an extruder. The glass mat and the coating 67 of thermoplastic particles are then delivered between opposing belts 68 and 70 of conveyor sections 72 and 74, which are arranged in an overlying relationship. The conveyor sections 72 and 74 deliver the glass mat and thermoplastic particles through an oven 76, which, for polypropylene based waste, raises the temperature of the materials to approximately 400° F. for approximately 10 seconds to form a thermoplastic composite web 100. Upon exiting oven 76, thermoplastic composite web 100 is compressed between a series of opposing nip rollers 78 as composite web 100 is permitted to travel across a sufficient length of conveyor section to permit cooling of the composite. After appropriate cooling has occurred, composite web 100 is collected, such as by winding around a spool 80, for later use.

Figure 3:
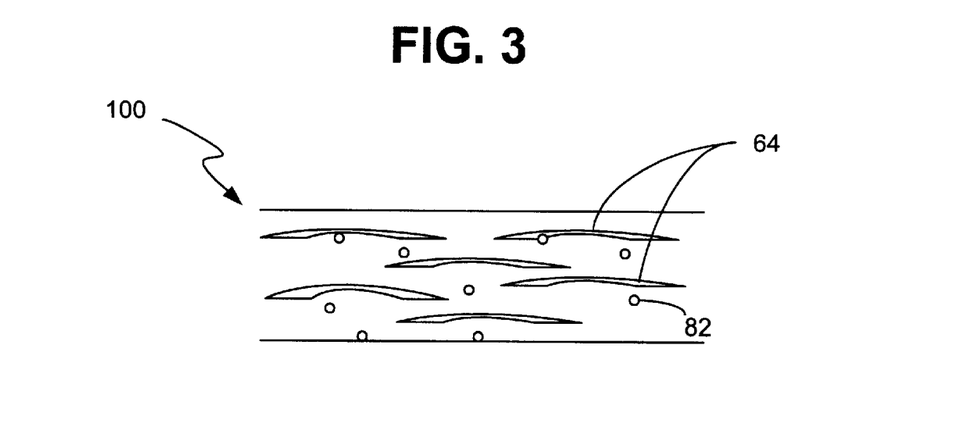
FIG. 3 is a cut-away cross-sectional side view of a preferred thermoplastic composite web of the present invention.
Figure 4:
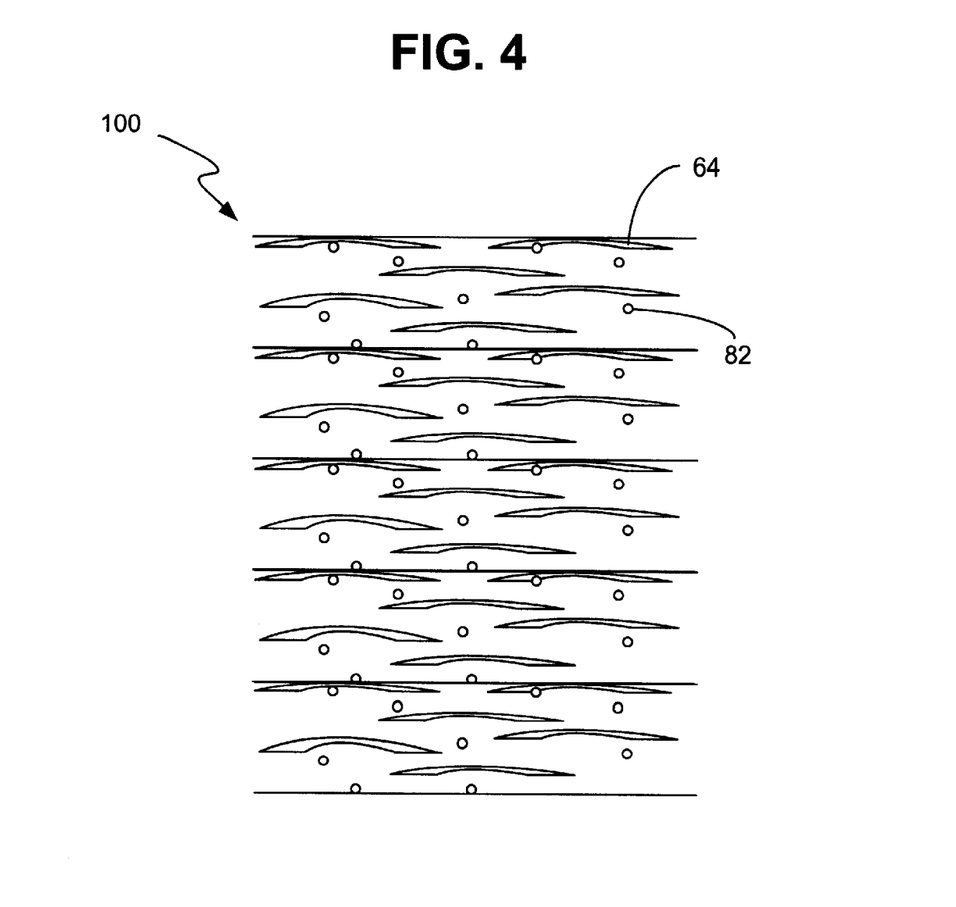
FIG. 4 is a cut-away cross-sectional side view of a thermoplastic composite laminate of the present invention.

As shown in FIG. 3, thermoplastic composite web 100 includes high modulus fibers, i.e. glass mat 64, as well as thermoplastic material 82 which, through the aforementioned manufacturing process, has transformed from the coating 67 of thermoplastic particles and migrated throughout the various interstices of the fibers. Thermoplastic composite web 100 is suitable for use in various applications, described in greater detail hereinafter, and can also be further processed, such as by laminating multiple webs together. For instance, multiple webs can be cut and then arranged in an overlying relationship with each other. The multiple webs are then subjected to heat and pressure as mentioned hereinbefore. In this manner, thermoplastic composite webs 100, such as shown in FIG. 4, are converted into thicker laminates.

Figure 5:
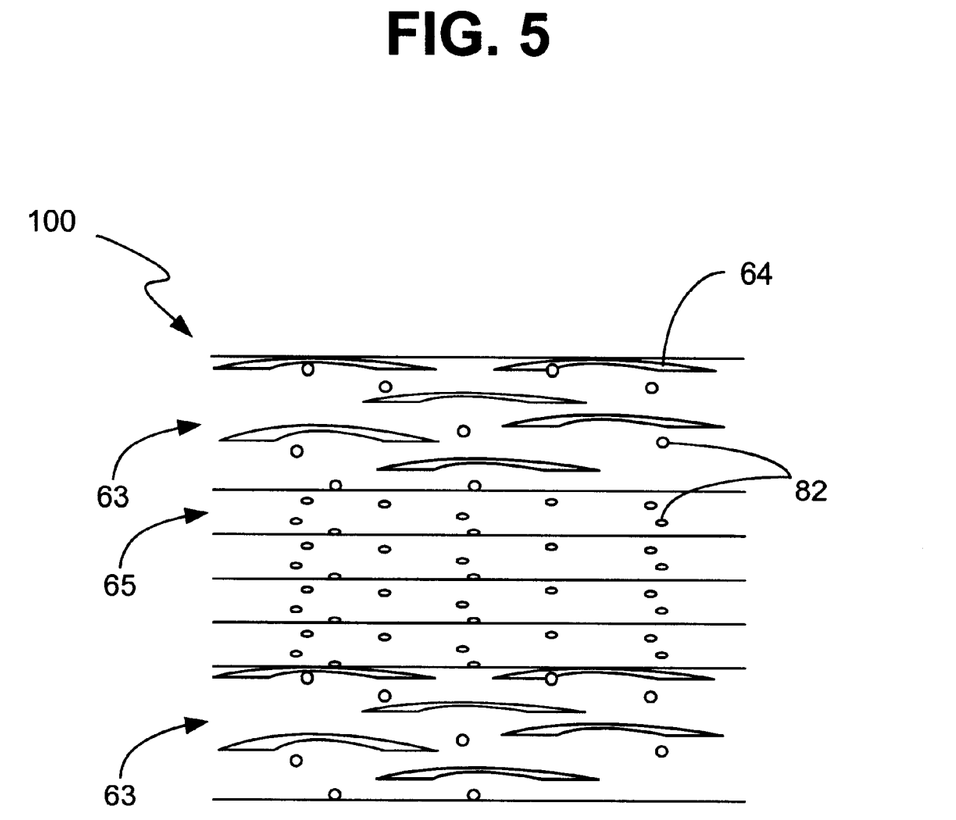
FIG. 5 is a cut-away cross-sectional side view of an alternative thermoplastic composite laminate of the present invention.

One distinction between webs and laminates is based on basis weight, e.g., the amount of material per unit area. The webs have a basis weight below 1,500 g/m$^2$, preferably below 1,000 g/m$^2$, since these webs can be easily taken up as a roll as depicted in FIG. 2. By making thin webs, it possible to make laminates with consistent compositions through the thickness, as shown in FIG. 4, as well as laminates with gradients in composition, as shown in FIG. 5. In the illustration shown in FIG. 5 only the surface webs or skins 63 contain glass mat 64. The core webs 65 contain thermoplastic material 82 and may contain some reinforcing fibers, fillers and voids. By using less reinforcing fiber in the core, a lower cost laminate can be produced which still exhibits enhanced flexural stiffness and strength due to the reinforced outer skins.

Preparation of carpet waste for use in the thermoplastic composites 100 of the present invention is dependent upon the type and source of the waste. For example, shear lint and recycled polypropylene fibers typically require no preparation other than debulking. Whole carpet scrap and edge trim, on the other hand, can be prepared for use by guillotining and shredding into pieces on the order of one inch in length. If the lengths are much greater, e.g. well over two inches, carpet waste does not disperse well and it is difficult to fully wetout the glass with the molten thermoplastic. Since the cost to shred material increases as the particle size is reduced it is preferable to use large size particles which may approach one to two inches in fiber or yarn length. The lateral dimensions of these pieces are considerably less than one inch. The less fibrous portions of this chopped waste are often much smaller than the long sections of fibers of yarns. The chopped, shredded carpet can then be debulked before use.

As previously described in relation to FIG. 2, recycled thermoplastic can be prepared by extrusion. The extrudate preferably is converted into pellets, such as pellets 52, or powder for dispersal onto reinforcing fibers. The extrudate also can be applied directly onto the reinforcing fibers as a molten sheet. Through extrusion, volatiles can be stripped from the recycled thermoplastic and additives, such as fiber adhesion promoters, can be mixed with the thermoplastic. Alternatively, the extrudate can be shaped as a thin web, which is then combined with the reinforcing fibers.

In order to evaluate the present invention, sheets of thermoplastic composite 100 were made by laminating fiber glass mat and shredded carpet scrap in a compression mold. Multiple layers of each were used to result in a desired thickness and glass content. In general, the process of making a consolidated sheet involved the steps of preparing the carpet scrap, layering the carpet scrap with layers of glass mat, and subjecting such layered structure to heat and pressure. While the present exemplary embodiments were prepared using this batch compression molding process, a roll, belt, or indexing press laminating method can be used to make the sheets depending upon whether a continuous sheet, large panel, or other form of product is desired.

The preferred processing temperatures of polypropylene, nylon-6, nylon-6,6 and PET are different due to differences in melting temperatures and molecular weight. For polypropylene the melt processing range is typically 375 to 450° F. For nylon-6 this range is 450 to 550° F. For PET, this range is 500 to 575° F. and for nylon-6,6 this range is 525 to 600° F. Since SBR latex tends to degrade above 500° F., mixtures which are high in polypropylene and/or nylon-6 are preferred when significant quantities of SBR are present.

EXAMPLE 1

A composite was prepared according to the following procedure. Shredded whole nylon carpet scrap having a composition of about 56% nylon, about 11% polypropylene, and about 33% SBR plus filler was debulked at 400° F. and 2 tons force (a pressure less than 100 psi) for 10 minutes to obtain compact carpet sheets. A conventional glass mat having a basis weight of 300 g/m² (1.0 oz/ft²) was used as was a fine glass mat having a basis weight of 215 g/m² (0.7 oz/ft. A 50 ton Wabash press and an aluminum mold with a 4"×12" cavity were used for compression molding at 450° F. to 500° F. and 2.25 tons force. The press platen chamber was maintained at 24 in. Hg vacuum. The glass mats and compacted carpet sheets were arranged in the following manner: aluminum foil/one layer of fine glass mat/one layer of glass mat/one layer of compact carpet sheet/two layers of glass mat/one layer of compact carpet sheet/one layer of glass mat/one layer of fine glass mat/aluminum foil. The weight of carpet sheet was about 60–80 grams and that of glass mat about 20–60 grams. The weight percentage of glass mat was controlled to be about 40%. The composite was molded for 10 minutes, then the plates allowed to cool. When the temperature reached 120° F., the pressure was released and the mold was opened. The thickness, density and other properties of the composites formed at 450° F. and 500° F. are shown in Table 1. The tensile behavior of the composites were tested using ASTM D638-90 with a test speed of 2 in/min, a gauge length of 2', and a distance between the grips of 4.5". A sample of AZDEL® SM10400 was evaluated concurrently.

TABLE 1

| | Thickness (inches) | Density (g/cm³) | Glass (%) | Tensile Str. (psi) | Elong. at Break (%) |
|---|---|---|---|---|---|
| molded at 450° F. | 0.110–0.130 | 1.45–1.46 | 40 | 12,200 | 8.20 |
| molded at 500° F. | 0.090–0.120 | 1.44–1.52 | 40 | 15,800 | 7.85 |
| AZDEL ® SM10400 | 0.145 | 1.18 | 40 | 8,100 | 6.60 |

EXAMPLE 2

Edge trim polypropylene carpet waste was used, having a composition of about 40% polypropylene, about 15% face fiber, mostly nylon-6 with some nylon-6,6, and 45% SBR resin plus calcium carbonate filler. The waste was chopped to about 1 inch. A 10 ton Wabash press was used to debulk the scrap at a temperature less than 450° F. and a pressure less than 100 psi. The compacted sheet was used in forming a consolidated sheet with glass fiber mat. The carpet sheets and glass mat were stacked, alternating carpet and glass sheet, with five layers of glass mat and four layers of carpet sheet. The glass mat had a basis weight of about 365 g/m² (1.2 oz/ft²). A Wabash 50 ton vacuum compression press with 18" by 18" platens was used at between about 425F and 500° F. and 24" Hg vacuum. 50 to 150 psi was applied for less than 10 minutes. The tensile strength of the samples was measured as described above. Results of Example 2 are presented in Table 2.

EXAMPLE 3

Polypropylene derived from a separation process used to obtain nylon from carpet was used to produce a composite. The recycled polypropylene was estimated to be about 98% pure and had the consistency of shear lint. The material was debulked and processed as described in Example 2. For tensile testing, tensile samples were prepared to be 6.5 inches long by 0.75 inches wide with a gauge section width of 0.5 inches (ATSM D638, type 1). The compression molded GMRT samples were cut using a diamond saw. The gauge section of the samples were shaped using a Tensilkut milling machine. All tensile tests were conducted at room temperature on an INSTRON 1125 test machine. The tensile speed was 2 inches/min, the gauge length 2.0 inches and the distance between the two grips 4.5 inches. The detailed procedure in ASTM D638-90 was followed. An extensometer 2630-106 (gauge length: 25 mm, travel: +12.5/−2.5 mm) was used for modulus measurements. Impact tests were performed with a Dynatup 830-I impact tester on the compression molded GMRT samples. A dart with a weight of 35 lb was dropped on a 4 inch by 4 inch sample at a velocity of 11.2 inches/second. The detailed procedure followed ASTM D3763-92.

Table 2 presents the results of Example 3. It is noteworthy that the laminates based on edge trim and separated polypropylene have properties which equal or exceed the commercial Azdel composite based on virgin polypropylene.

TABLE 2

|  | Thickness (inches) | Density (g/cm³) | Tensile Str. (psi) | Elong. at Break (%) | Tensile Mod. (psi) | Impact Str. (ft-lb) |
|---|---|---|---|---|---|---|
| Edge Trim | 0.110–0.130 | 1.52 | 15800 | 7.9 | 1.2 × 10⁶ | 16 |
| Separated polypropylene | 0.090–0.120 | 1.18 | 13900 | 8.8 | 9.5 × 10⁵ | 17 |
| AZDEL PM10400 | 0.145 | 1.18 | 12400 | 3.0 | 7.9 × 10⁵ | 17 |

TABLE 3

| Sample | Layers of Mat | Wt. of Each Mat (g) | Layers of Compact Sheet | Weight Each Sheet (g) | Total Wt. (g) |
|---|---|---|---|---|---|
| 40% glass | 4 | 40 | 5 | 48 | 400 |
| 30% glass | 3 | 40 | 4 | 70 | 400 |
| 20% glass | 2 | 40 | 3 | 106.7 | 400 |
| 0% glass | 0 | 40 | 4 | 100 | 400 |

TABLE 4

|  | Tensile Str. (psi) | Tensile Mod. (psi) | Elong. at Break (in) | Flexural Str. (psi) | Flexural Mod. (psi) | Impact Str. (ft-lb) |
|---|---|---|---|---|---|---|
| Lint PP-0% glass | 3,700 | 250,000 | 0.17 | 5,700 | 210,000 | 4.1 |
| Lint PP-20% glass | 5,900 | 310,000 | 0.21 | 6,100 | 270,000 | 11.5 |
| Lint PP-30% glass | 8,000 | 400,000 | 0.21 | 6,400 | 270,000 | 13.5 |
| Lint PP-40% glass | 12,200 | 850,000 | 0.18 | 7,700 | 450,000 | 16.0 |
| Recycled PP-0% glass | 3,900 | 260,000 | 0.20 | 5,300 | 220,000 |  |
| Recycled PP-20% glass | 6,100 | 310,000 | 0.22 | 6,100 | 230,000 |  |
| Recycled PP-30% glass | 9,600 | 640,000 | 0.19 | 8,100 | 370,000 |  |
| Recycled PP-40% glass | 12,700 | 990,000 | 0.17 | 9,300 | 500,000 | 20.9 |
| AZDEL SM10300 | 11,300 | 820,000 | 0.15 | 16,000 | 490,000 |  |

EXAMPLE 4

Polypropylene carpet shear lint was debulked in a Wabash press at 375° F., using 1 ton force (a pressure less than 100 psi) applied for 2–4 minutes to obtain a compacted sheet. The compacted sheets were compression molded with glass mat having a density of 450 g/m² (1.5 oz/ft). Consolidated sheets having a glass percent ranging from 0 to 40% were made by altering the number of layers of glass mat and thermoplastic sheet. Table 3 describes the arrangement of layers for consolidated sheets created. The compression mold was operated at a temperature of about 375SF and a pressure of 50 psi for 3 minutes. Results of tests on the consolidated sheet are presented in Table 4.

EXAMPLE 5

Polypropylene recycled from carpet was prepared into consolidated sheets having glass fiber percentages ranging from 0 to 40%. The recycled polypropylene had the consistency of shear lint and was processed as described above in Example 4. The compression molding time for the recycled polypropylene was 6 minutes to compensate for the amount of flash squeezed out. The results of tests on the resulting consolidated sheets of Example 5 are presented in Table 4. The strength, modulus and impact strength all increase significantly as more glass is added. The impact strength shows the greatest increase. The use of long glass fibers is considered essential for achieving such a large increase in impact strength.

Composites prepared with less than 40% glass may be useful for some purposes. However, in general, it is desired to have a glass fiber content about 40% by weight. It is preferable that the total percent of unmeltable components (including glass, calcium carbonate, and dirt) be less than 60% by volume. At greater percentages the strength of the composite may be low. In addition, if the total percent of unmeltables is greater than 50% by volume, the composite cannot be easily compression molded.

EXAMPLE 5

Recycled polypropylene pellets were obtained with a Melt Flow Rate between 20 and 30 (ASTM 1238), similar to polypropylene face fiber. The pellets were converted into powder with a particle size mostly below 400 microns in order to use an existing powder coater. Multiple glass rovings were chopped in line into one inch lengths and dispersed onto a moving belt, creating a glass mat with a basis weight of 225 g/m². The recycled polypropylene powder was dispersed over the glass mat, creating a composite web with a basis weight of 560 g/m² and a glass content of 40 wt. %. The web then entered an oven at 400° F. while confined between upper and lower moving belts. Next the web passed through a cooling zone while still confined between the moving belts. Pressurized nip rollers applied a low consolidation pressure through the belts on the web. The residence time of the composite web in the heating and cooling zones was less than two minutes. After the cooling zone the web was wound up as a roll. Fused polypropylene was evident on both the top and bottom of the web. Next the web was cut into 12"×12" plies, stacked and compression molded using the Wabash press, a platen temperature between 375 F and 450 F, and a pressure between 50 and 100 psi. The laminates obtained were cut for mechanical testing The test results are presented in Table 5.

EXAMPLE 6

Example 5 was repeated with 5 wt. % of the recycled polypropylene replaced with Epolene 43P, a maleated polypropylene powder obtained from Tennessee Eastman Chemical Co. The maleated polypropylene improves the bond between glass fiber and polypropylene, resulting in an increase in flexural strength. The test rests are presented in Table 5.

EXAMPLE 7

Example 6 was repeated but the glass fiber content was varied from 20 to 56 wt. %. The test results are presented in Table 5.

EXAMPLE 8

Example 6 was repeated with natural fibers used instead of glass fibers. The fibers were obtained as random mats. The test results are presented in Table 5.

EXAMPLE 9

Webs were made as described in Example 5, with the composition presented in Example 6. Two plies of web were laminated on the top and bottom of a ⅛ inch thick sheet of polypropylene purchased from Commercial Plastics. This laminate has a cross section which looks similar to that depicted in FIG. 5. The apparent flexural strength and modulus is reported for this sandwich structure in Table 5. Since the strength and modulus of the core were measured independently, the enhancement in strength and modulus by adding reinforced webs as skins is apparent.

EXAMPLE 10

This example illustrates another type of gradient structure. Webs were made as described in Example 5. Two webs were inserted between top and bottom layers of Twintex® fabric with a basis weight of 1,500 g/m2, obtained from Vetrotex, Inc. Twintex® consists of continuous polypropylene fibers commingled with glass fibers. In the fabric the fibers are oriented orthogonally (0°/90°). A laminate with this composition was compression molded and tested as described in Example 5. The laminate had an apparent flexural strength of 34,900 psi and an apparent flexural modulus of 1,760,000 psi.

EXAMPLE 11

This example illustrates another type of gradient structure. Webs were made as described in Example 5. A polypropylene honeycomb sheet was obtained from Nida-Core Corp. with a thickness of ½ inch. A sandwich structure was made with 3 webs with 40 weight percent glass and one web with 30 weight percent glass on each side of the polypropylene honeycomb. The webs were heated to 400° F. and then the cold core was pressed into the hot web. For ease of handling in the laboratory, each surface was bonded to the core separately. The final sandwich was 0.46 inches thick. Flexural testing was performed with a span of 4 inches and a width of one inch. The slope of the load-deflection curve was found to be 340 pounds per inch, which is a measure of the flexural stiffness of the sandwich. Without the honeycomb core and a sample thickness of 0.11 inch, equal to the thickness of the top and bottom skins, the slope is 60 pounds per inch.

TABLE 5

|  | Flexural Strength, (psi) | Flexural Modulus, (psi) |
|---|---|---|
| Example 5 (40 wt. % glass) | 13,000 | 860,000 |
| Example 6 (40 wt. % glass) | 16,200 | 810,000 |
| Example 7 (20 wt. % glass) | 10,100 | 490,000 |
| Example 7 (56 wt. % glass) | 19,500 | 1,280,000 |
| Example 8 (40 wt. % sisal) | 7,200 | 410,000 |
| Example 8 (40 wt. % hemp) | 7,000 | 450,000 |
| Example 9 (polypropylene core) | 11,500 | 540,000 |
| Example 9 (core, no skins) | 5,500 | 220,000 |
| Example 10 | 34,900 | 1,760,000 |

Method of Using

High modulus fiber reinforced thermoplastics in the form of consolidated sheets can be used as is or can be shaped into blanks for compression molding parts. One method of forming parts has been called "melt flow stamping" or "forming". In general, it involves the use of pre-cut and preheated blanks placed in a matched die compression mold. Force is then applied to the blank so that the composite flow forms to fill the mold cavity. In general the blank is preheated to an internal temperature of 400° F. and then molded for 40–60 seconds at a pressure of 1500–2000 psi. It is of course preferable that the composite spread to completely fill the mold and in this respect, the percentage of glass and other unmeltables (such as filler and dirt) must be controlled so that the composite is not too viscous to properly spread. A maximum of about 50–60% unmeltables has been found to be appropriate.

Another embodiment of the invention is envisioned wherein a homogenous mixture of glass fibers with shredded carpet would be used rather than the laminated structure of fiber glass mat and shredded carpet scrap described above. In this alternate embodiment, long glass fibers, measuring about 2 inches, would be thoroughly mixed with shredded carpet scrap in a manner so as to ensure that the lengths of the fibers would be substantially maintained. The mixture would then be formed into a desired thickness sheet or other desired shape and allowed to cool.

Still another embodiment is envisioned wherein chopped glass fibers and chopped recycled thermoplastic fibers are deposited onto a belt in a continuous lamination process that produces a thin, flexible unconsolidated web less than about 0.1 inches in thickness. Multiple layers of this web can be consolidated into a thicker sheet which is then cut into blanks for compression molding. Alternatively, multiple layers of the web can be used directly in compression molding.

Since carpet and other thermoplastic fiber waste streams are or can be converted into a chopped fiber form, it is convenient to blend these fibers with chopped reinforcing fibers using conventional textile blending processes. The cotton system, known as ring spinning, can be used to open bales of chopped fibers, air convey and then blend the fibers. As in staple fiber yarn production, the air conveying can partially clean the fibers by separating out some of the dirt and calcium carbonate that may be present. After blending, the mixed and carded fibers are laid down as a web on a moving belt. The web is then heated to melt the thermoplastic fibers and pressed to debulk the web. Concurrently or separately, multiple webs can be combined in continuous or batch laminating presses to provide sheet form. In flow molding applications it is not always necessary to have blanks as consolidated sheets. Thus, both sheet stock, weighing 1,500 to 6,000 g/m² (5 to 20 oz/ft²), and web, weighing 150 to 1500 g/m² (0.5 to 5 oz/ft²), are useful product forms.

A continuous manufacturing process is envisioned similar to one used to manufacture sheet molding compound. Double belt presses could be used and a quantity of chopped carpet scrap could be dispensed onto a glass mat lying on a moving belt. A laminate structure would be assembled as described above and subjected to heat and pressure to form a dense composite.

The thermoplastic waste can be densified and coarsely ground to a powder on the order of less than one mm for direct application to reinforcing mats using a powder dispenser. Since chopped glass mat can be produced in line with a basis weight of 200 g/m², a 40 weight percent web can be produced by depositing 150 g/m² of powder, followed by the chopped glass, and then followed by 150 g/m² of powder. Then the powder would be melted and pressed into the glass mat, usually continuously.

While the composite has been disclosed as including glass or natural fibers, it is anticipated that other types of high modulus fibers could be included such as, for example, aramid and carbon and fibers. While aramid and carbon fibers would lead to composites with impressive properties, these fibers are much more expensive than glass and natural fibers. Since the recycled thermoplastic matrix is less expensive than glass fibers, the emphasis for low cost composites is on the glass and natural fibers. Further, recycled glass can be used, yielding a fully recycled composite product. Moreover, the present invention envisions using glass fibers having a length greater than about ½ inch. Fibers having a lesser length would result in a product having poorer impact properties.

While the examples presented above illustrate the use of 100% recycled thermoplastic and fillers and contaminants found with the recycled thermoplastic, it will be apparent to those of skill in the art that a portion of the matrix could be virgin thermoplastic. The determination of the percentage will be based upon economic considerations and customers' preferences.

A wide variety of thermoplastic waste streams can be considered. Thermoplastic wastes from fiber spinning plants are well suited for producing GMT. Textile wastes from the apparel and industrial fabrics industries can be used as long as the thermoplastic content of the waste stream exceeds 50% by volume. This degree of thermoplastic content can be met by partial purification of the waste stream. Thermoplastic waste from the plastics industry provides another source of matrix material. In general, injection molding grades of resins are preferred over extrusion grades in order to wet out the reinforcing fibers. Since carpet backing, which is based on an extrusion grade of polypropylene, has been used successfully to make GMT the use of the higher flow injection molding grades is merely a processing preference. As with carpet waste, post-consumer waste can be used to make GMT. It is preferable to at least partially purify the waste so that the waste stream has at least 50% by volume of one class of polymer. Two prime choices would be recycled PET bottles and recycled polypropylene bottles. High density polyethylene, HDPE, bottles are a good source of matrix material. These bottle wastes can be applied to glass mats as a powder.

The foregoing description has been presented for purposes of illustration and description. It is not intended to be exhaustive or to limit the invention to the precise forms disclosed. Obvious modifications or variations are possible in light of the above teachings. The embodiment of embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A thermoplastic composite, comprising:
   a matrix of recycled thermoplastic comprising at least one of the group consisting of polyethylene, polypropylene, nylon, PET and styrene-butadiene rubber; and
   a plurality of high modulus fibers, said high modulus fibers comprising at least one of the group consisting of glass fibers, natural fibers, carbon fibers, and aramid fibers, each of said high modulus fibers having a minimum length of approximately ½ of an inch and a minimum modulus of one million psi, wherein a positive amount up to 10 percent by weight of said recycled thermoplastic comprises a graft copolymer of maleic anhydride with polypropylene for bonding said recycled thermoplastic to said high modulus fibers.

2. The thermoplastic composite of claim 1 wherein said recycled thermoplastic is derived from carpet and said high modulus fibers comprise glass fibers in a weight percentage of about 20% to 60%.

3. The thermoplastic composite of claim 1, wherein said thermoplastic composite has a basis weight of between approximately 150 and approximately 1500 g/m².

4. The thermoplastic composite of claim 1, wherein said natural fibers comprise at least one of the group consisting of cotton, kenaf, sisal and hemp fibers.

5. The thermoplastic composite of claim 1, wherein said thermoplastic composite is a laminate with a basis weight greater than 1,500 g/m².

6. The thermoplastic composite of claim 1, wherein said thermoplastic composite has a first skin and a second skin and a core disposed therebetween, and said skins have a higher content of said high modulus fibers than said core.

7. The thermoplastic composite of claim 6, wherein the reinforcing fiber content of said core is less than approximately 20 percent by weight.

8. The thermoplastic composite of claim 6, wherein said core contains more than approximately 5 percent voids by volume.

9. The thermoplastic composite of claim 6, wherein said core is configured as a honeycomb structure.

10. The thermoplastic composite of claim 6, wherein said skins contain said high modulus fibers oriented in no greater than two principal directions.

11. The thermoplastic composite of claim 2, wherein said carpet comprises at least one of latex adhesive-based carpet and hot-melt adhesive-based carpet.

* * * * *